United States Patent [19]

Kiessling et al.

[11] Patent Number: 4,597,841

[45] Date of Patent: Jul. 1, 1986

[54] PROCESS OF RECOVERING LEAD FROM OLD LEAD ACCUMULATOR SCRAP AND REDUCTION PLATE FOR THIS PROCESS

[75] Inventors: Rainer Kiessling, Anröchte; Voitěch Plzák; H. Wendt, both of Darmstadt, all of Fed. Rep. of Germany

[73] Assignee: Hagen Batterie AG, Fed. Rep. of Germany

[21] Appl. No.: 693,946

[22] Filed: Jan. 23, 1985

[30] Foreign Application Priority Data

Jan. 24, 1984 [DE] Fed. Rep. of Germany ....... 3402338

[51] Int. Cl.$^4$ .............................................. C25C 1/14
[52] U.S. Cl. ................................... 204/115; 204/114; 204/119; 75/77; 75/78
[58] Field of Search ........................ 204/114, 115, 119; 75/65 R, 77-78

[56] References Cited

U.S. PATENT DOCUMENTS

| | | | |
|---|---|---|---|
| 588,883 | 8/1897 | Salom | 204/115 |
| 2,070,513 | 2/1937 | Cummings | 204/119 |
| 2,724,732 | 11/1955 | Howard | 204/115 |
| 4,400,247 | 8/1983 | Ginatta | 204/114 |

FOREIGN PATENT DOCUMENTS 1368423 9/1974 United Kingdom ................ 204/115

OTHER PUBLICATIONS

General Chemistry, H. Sisten et al., 1949 MacMillan Co., p. 452.

Primary Examiner—R. L. Andrews

[57] ABSTRACT

A process of recovering lead from old lead accumulator scrap comprises the mechanical comminution of the old lead accumulators, the collection of old acid, the sifting of the broken plastic from the mixture of lead and lead compounds, the initial separating off of larger metallic parts, the application of the mixture of lead and lead compounds as a porous layer to a cathode plate and the arrangement thereof with the cathode plate in dilute sulphuric acid as an electrolyte opposite to an anode plate at a small spacing, and the reduction of the lead compounds to lead by the flow of current from the cathode plate to the anode plate. The electrolysis is first carried out at a higher sulphuric acid concentration and then at a lower sulphuric acid concentration.

50 Claims, 3 Drawing Figures

PROCESS OF RECOVERING LEAD FROM OLD LEAD ACCUMULATOR SCRAP AND REDUCTION PLATE FOR THIS PROCESS

The invention relates to a process of recovering lead from old lead accumulator scrap wherein the old lead accumulators are mechanically comminuted, wherein old acid is collected, wherein the broken plastic is separated by sifting from the mixture of lead and lead compounds, wherein coarser metal parts are initially separated, wherein the mixture of lead and lead compounds present as a powder/grain mixture is applied as a porous layer to a cathode plate and arranged with the latter at a small spacing from an anode plate, and wherein the lead compounds are reduced to lead by a flow of current from the cathode plate to the anode plate.

The recovery of raw materials, and in particular of lead from used up lead/sulphuric acid accumulators has shown itself to be very important for the saving of lead and for the reduction of environmental pollution through lead compounds.

It is already known to dismantle old accumulators by breaking them up and by gravity separation into broken plastic, coarser lead parts (poles, terminal strips etc.) and a mixture of lead and lead compounds. The latter must then be converted into lead by suitable processes. Known pyrometallurgical purposes for the conversion of the mixture of lead and lead compounds into metallic lead have the disadvantage that a considerable amount of dust develops and sulphur dioxide emissions occur which, in order to avoid considerable environmental pollution, can only be kept under control at high expense in very large preparation plants. In addition metal sulphates occur which give rise to considerable disposal problems.

Wet metallurgical processes have already been developed in order to reduce the problems which occur with sulphur dioxide emission and the emission of lead containing dusts. However, a considerable problem exists here in converting into lead the coarse crystalline lead sulphate, the so-called hard sulphate, which is present to a considerable extent in old lead accumulators. In order to break down the hard lead sulphate it is necessary to carry out expensive multi-stage conversions in all wet metallurgical processes. The sulphate content is recovered in the form of ammonium or potassium sulphate which is contaminated by lead and arsenic and which cannot be straightforwardly used again, for example as artificial fertiliser, because of the impurities.

In order to avoid the difficulties associated with the pyrometallurgical and wet metallurgical processes it has also already become known (GB-PS No. 13 68 423) to arrange the mixture of lead and lead compounds in the form of broken pieces, grains, powder or a paste on a cathode plate and to place this in dilute sulphuric acid opposite an anode. By the passage of a current of approximately 16 A/kg during a period of approximately 20 hours some 95% of the lead contained in the mixture of lead and lead compound scrap can be recovered in metallic form with the current efficiency lying above 60%.

The current yield in the known process is however not satisfactory, the reduction time is too long and the break down of the hard lead sulphate in particular is unsatisfactory. Moreover the mixture of lead and lead compounds is relatively difficult to handle because it is arranged as a loose heap on a horizontally disposed plate or on a horizontally running cathode band.

The object of the invention is now to provide a method of the initially named kind which can be carried out with high efficiency, wherein the lead contained in the mixture of lead and lead compounds is recovered with as high a current yield as possible and as completely as possible in metallic form, without too great expenditure of time and with a low specific space requirement for the reactor, and wherein moreover the sulphate content occurs in the form of sulfuric acid which is as concentrated as possible and which can be re-used, for example as accumulator acid.

In order to satisfy this object the invention envisages that the electrolysis is first carried out at a higher sulphuric acid concentration and then at a lower sulphuric acid concentration.

In accordance with the invention one preferably avoids the dilution of the sulphuric acid during the electrolysis, whereby the sulphuric acid concentration continuously and continually increases both during electrolysis at the higher sulphuric acid concentration and during electrolysis at the lower sulphuric acid concentration.

Although the process can fundamentally also be continuously carried out in counterflow it is preferable to carry it out in two stages discontinuously. All statements of concentration will be understood to be percentages by weight.

The process of the invention can be carried out particularly economically if the electrolysis in the second stage is continued until a concentration of the sulphuric acid is reached which corresponds to the initial concentration of the sulphuric acid in the first stage. The concentrated sulphuric acid present in the electrolysis bath at the end of the second reduction stage can then be used for carrying out the first reduction stage of a further mixture of lead and lead compounds. Furthermore, one can proceed in economical manner in such a way that at the end of the electrolysis at the higher sulphuric acid concentration the free electrolyte is removed from the reaction vessel and is replaced by water, preferably the consumed flushing water which arises at the termination of the second stage.

The first reduction stage can be carried out in such a way that a sulphuric acid concentration of for example 36% is present as the electrolysis bath at the end of the reduction, electrolysis bath can then be used straightforwardly as accumulator acid for a new lead accumulator. The process in accordance with the invention is thus itself able to prepare all the sulphuric acid needed for carrying out the process and moreover to generate diluted sulphuric acid for use in lead accumulators. By suspending the mixture which is steeped with sulphuric acid which is obtained at the end of the first stage in water one can realise the reduced sulphuric acid concentration necessary for the second reduction stage in the simplest conceivable manner. A particularly high yield of metallic lead is obtained at a relatively low current consumption if the electrolysis at the higher sulphuric acid concentration is carried out until the end of the reduction of the tetravalent lead and at the lower sulphuric acid concentration until the end of the reduction of the divalent lead.

A further object of the invention is to improve the handling of the mixture of lead and lead compounds and simultaneously to effect a substantially complete conversion of the lead compounds into lead at high current yield.

In order to solve this further object of the invention the invention envisages, preferably using the above described method, that the mixture of lead and lead compounds is pressed with the cathode plate to a thin self-supporting reduction plate. As a result of this construction the mixture of lead and lead compounds can be handled not only lying in a horizontal position but instead in any desired arrangement, for example also with a vertical positioning of the reduction plate.

When compared with the process known from GB-PS No. 13 68 423 the pressing in accordance with the invention to a self-supporting plate results in a substantially improved conductivity which favours a better current yield. In this way a substantially constant potential is obtained over the entire plate. As a result of the so formed fixed matrix the potential drop in the direction of the thickness of the plate is minimal. The reduction front progresses uniformly from the surface facing the electrolyte into the interior of the plate. Moreover, the compression of the mixture of lead and lead compounds associated with the pressing considerably reduces the transport paths for the ions. It is particularly preferable for the cathode plate to be apertured. It can for example have the form of a perforated metal sheet. The cathode plate is however expediently formed as a cathode grid and the cathode grid can exist of expanded metal. As a result of this construction the mixture of lead and lead compounds can also be located in the apertures or openings of the grid where it is on the one hand anchored well and on the other hand also very close to the material of the cathode plate which lies at a fixed potential.

The economy of the process of the invention is further increased when using an apertured cathode plate if the pressed mixture of lead and lead compounds extends away from both sides of the cathode plate. The apertures or grid openings of the cathode plate should not be larger than 2 cm in their largest dimension. It is advantageous to use apertures or grid openings of no greater dimension than 1.5 cm. Optimum grid openings or apertures have found to be about 1 cm across in their largest dimension.

In this manner the largest spacing of any regions inside the mixture of lead and lead compounds from parts of the cathode plate is in any case substantially less than 1 cm which is of considerable importance for a uniform potential at all points of the mixture.

In order to manufacture the pressed mixture of lead and lead compounds it is expedient if this mixture is homogenised with water prior to the pressing. A water content of about 2% to 20% by weight may be used in the pressed mixture. It has been found that a water content of about 6% to about 10% by weight is preferable. Pressure should be applied to the mixture in the range of about 100 kp/cm$^2$ to about 600 kp/cm$^2$. To achieve the desired conductivity, pressures of about 200 kp/cm$^2$ to about 500 kp/cm$^2$ have been found preferable.

Particular importance is attributed in accordance with the invention to the electrical conductivity of the pressed reduction plate. If the conductivity of the lead and lead dioxide contained in the mixture of lead and lead compounds is not entirely adequate a preferred embodiment provides for the mixture of lead and lead compounds to be mixed with finely divided lead (finely divided lead grid), which likewise originates from the working up of scrap, so that neither recovered metallic lead nor additional lead from the outside is necessary for the process.

In general the reduced lead is melted out in a lead fusion bath. In the latter case a layer of slag which has a high proportion of metallic lead forms, particularly on the surface of the fusion bath. In this embodiment it is particularly economical if the lead which forms in or on the lead fusion bath is mixed with the mixture of lead and lead compounds to be reduced. The conductivity is thus achieved here by the addition of a waste product with the finely divided lead in the mixture of lead and lead compounds then also being broken down almost completely to metallic lead in advantageous manner.

The cathode plate used in accordance with the invention can expediently consist of steel, expanded lead metal, titanium or copper.

A steel grid is particularly stable and can be economically manufactured. It tends however to corrosion and to the generation of hydrogen.

The use of expanded lead metal has the consequence that not only the reduced mixture of lead and lead compounds but also the cathode plate itself is completely dissolved during melting out in the lead fusion bath.

Titanium as a support for the mixture has the advantage that it does not form an alloy with lead and can be re-used as often as desired.

A copper support is particularly advantageous with the copper preferably being present in the form of expanded copper metal. The copper is protected against corrosion by the lead coating which is present. Copper is substantially less expensive than titanium.

The porosity of the reduction plate of the invention, which is exactly defined by the pressing process, is of great significance. Porosity in the mixture of about 50% to 70% was found to be preferable, with a porosity of about 60% found to be especially desirable. One is concerned here with the initial porosity of the reduction plate. During the process of the invention the porosity continuously increases because the oxide and the sulphate are reduced. In the interstices the deposition of lead preferably takes place in the finest of crystalline forms, whereby a substantial interlocking of the metal crystals that are formed takes place. In this way new fields of the reduction plate are continually electrically connected to the regions of the plate which are already at the desired potential, provided such small isolated fields are still present in the reduction plate. The reduction takes place primarily at the surface of the lead parts and lead crystals which are already present in the reduction plate. From there the lead sponge grows. During the reduction process both the conductivity and also the porosity and the reactive surface thus continuously grow, and this is of particular importance for the completeness of the metal recovery and the good current yield. The prerequisite is however in each case that the reduction plate is not too thick and that the grid spaces are not too large so that all parts of the reduction plate can be connected as fully as possible and as free of resistance as possible to the desired cathode potential.

The current density used in the two reduction stages is also of particular significance for economical operation. In the first electrolyzing step at the higher electrolyte concentration, a current density of about 10 to 30 A/kg may be used. Current densities of about 15 to 25 A/kg have been found to be desirable, with about 30 A/kg most preferred. During the second electrolyzing step conducted at the lower electrolyte concentration, current densities of about 20 to 40 A/kg may be used.

Current densities of about 25 to 35 A/kg have been found to be desirable, with about 30 A/kg found to be most successful. The current density is expressed in A/kg rather than in the standard unit of $A/dm^2$ (where a $dm^2 = 10\,cm \times 10\,cm$) commonly used in metal plating because the area over which the current density is to be measured is uncertain due to the physical characteristics of the spongy lead material.

The preferred current densities of 20 and 30 A/kg respectively ensure a good space/time yield with the temporal behavior brought about by the process of dissolution of the lead sulphate and the diffusion speeds being ideally taken into account.

The method of the invention can be carried out with an electrolysis bath temperature and lead mixture temperature of at least about 25° C., but no greater than about 95° C. Temperatures of about 40° C. to about 80° C. are best, with 60° C. most preferred.

After the reduction in the second stage the reduction plates are flushed or rinsed in water in order to remove the sulphuric acid which is still contained therein. The flushing water that is used can be used in economical manner as the electrolyte for the start of the second reduction stage.

The containers in which the process of the invention is carried out preferably consist of wood or of steel lined with an acid-resistant synthetic material. The containers should be covered at the top in order to avoid splashes reaching the outside.

In the process of the invention it is thus only necessary to supply water in addition to the lead accumulator scrap while lead and sulphuric acid present at a favourable concentration are recovered. No environmentally damaging side products are created.

The entire process including the mechanical preparation thus takes place in four phases.

The first phase consists in the mechanical preparation by breaking and shredding of the old lead accumulators, the collection of the old acid, and subsequent mechanical sifting (for example gravity separation) of the mixture of lead, lead sulphate and lead dioxide from the broken plastic material.

In this first phase larger lead parts which are still present, such as connection terminals, electrodes, terminal strips etc. are separated off.

The production of the pressed reduction plates from the mixture of lead and lead compounds then takes place in the second phase, with coarse metallic parts having dimensions of more than 2 mm having been previously separated off. After the small grid parts and the slag have been added to this crude mixture the reduction plates including the cathode plate is pressed to the ideal thickness and porosity for the subsequent cathodic reduction process.

The third phase then consists in the two stage reduction of the porous reduction plates which are manufactured in this way. The described process for carrying out the cathodic reduction permits the reduction of the lead compounds contained in the crude electrodes to a degree of reduction of more than 98% with integral current yields of better than 70%.

In accordance with the invention it is possible to use either Pb—$PbO_2$ anodes or activated titanium anodes as anodes. Both variants guarantee the avoidance of contamination of the process by foreign elements.

In the third phase the lead dioxide is first predominantly converted in the sulphuric acid of higher concentration into lead sulphate with a relatively high current yield. The further reduction of the lead sulphate which primarily still remains takes place subsequently at the lower sulphuric acid concentration, likewise with a favourable current yield.

The process temperature of preferably 60° to 80° C. favours the dissolution and cathodic conversion of the lead sulphate. In this way, and also through the use of the process of the invention, the passivation of the lead dioxide components in the porous electrodes can be reliably avoided. The uniform electronic conductivity of the electrodes and their uniform reduction over their full depth is simultaneously ensured by the generation of a dendritic lead precipitate in the pores of the porous cathodes. The process conditions of the invention make reliable operation of the electrolysis process possible at continuously selected current densities of 15 to 30 A/kg without the integral current yield falling below approximately 70%. The production of porous crude reduction plates of predetermined porosity, thickness and electrical conductivity makes a substantially automated operation possible, which avoids bodily contact of the operators with the lead containing substances. Furthermore, the manner of operation reliably avoids undesired dust formation of the lead containing process substances, because the working materials and agents are always kept moist.

Furthermore, it is important for the invention to arrange the reduction plate provided with the cathode plate in direct contact with a porous separator of synthetic material or paper and then to arrange the anode in direct contact therewith so that as large a number as possible of the reduction plates of the invention can be accommodated in a container containing the electrolyte. This also brings about cell voltages which are as low as possible and large space/time yields for the carrying out of the reduction.

The dense arrangement of reduction plates, separators and anodes also makes it possible to mechanically support and hold the porous cathodes or reduction plates by the compact anodes which are manufactured in solid metal. To this extent the cathode grid used for the reduction plate does not need to be of excessively stable construction. In this way one can for example also use a lead grid in the manufacture of the reduction plates, whereby the subsequent fusion process is substantially simplified.

The grids of the porous reduction plates can however also be produced in other metals of higher mechanical strength and also adequate corrosion stability, such as iron, stainless steel, nickel, copper, titanium.

In the process of the invention very pure sulphuric acid of the concentration 36.4% (first stage) and 12% (second stage) is obtained either by the discontinuous or continuous supply of the calculated required balance of fresh water in the second reduction stage, and also by appropriate volumetrically monitored transfer of the sulphuric process acid from the second process stage into the first process stage and by removal of the process acid from the first and second process stages. As a result of the precleaning of the shredded mass the pure sulphuric acid satisfies the specification for accumulator acid and can thus be returned to the battery production.

The process of the invention thus permits the complete recovery and re-use of the sulphuric acid which is stored in the lead sulphate of the accumulator scrap, and the proportion of which is a maximum for fully discharged batteries. Chemical neutralisation with the generation of calcium sulphate or ammonium sulphate for example is only necessary for the old impure acid from the old lead accumulators.

The fourth phase consists exclusively in the melting out of the lead metal from the completely reduced reduction plate in a lead fusion vessel. The reduced lead sponge in the reduction plate is protected from oxidation by a protective gas, for example by the hot gases for the lead fusion vessel which have a reducing effect.

The important advantages of the process of the invention are as follows:

The emission of sulphur dioxide and also of lead containing vapors and dusts is completely avoided.

The sulphuric acid stored in the lead sulphate is completely recovered in a quality which permits re-use as accumulator acid.

The individual process steps enable a high degree of automation and thus ensure ideal conditions in order to avoid endangering the health of the operator by contact with lead and lead compounds.

By suitable layout of the process one obtains a low service cost for relatively low investment costs.

The process of the invention is also suitable for the construction of plants of small capacity (above approximately 0.5 t/d) for the working up of lead accumulator scrap, and is thus well suited for the decentralised working up of lead accumulator scrap, for example also in developing countries.

In accordance with the invention a considerable proportion of the electric heat is used for increasing the concentration of the sulphuric acid without additional vaporisation stages. The electric heat which is developed is thus sensibly exploited.

In accordance with the invention only approximately 10% of the processed lead is recirculated in the process, and indeed by the remixing of slag with the mixture of lead and lead compounds which is to be pressed.

BRIEF DESCRIPTION OF THE DRAWINGS

The invention will now be described in the following by way of example only and with reference to the drawing which shows.

DETAILED DESCRIPTION OF THE DRAWINGS

Figure 1:
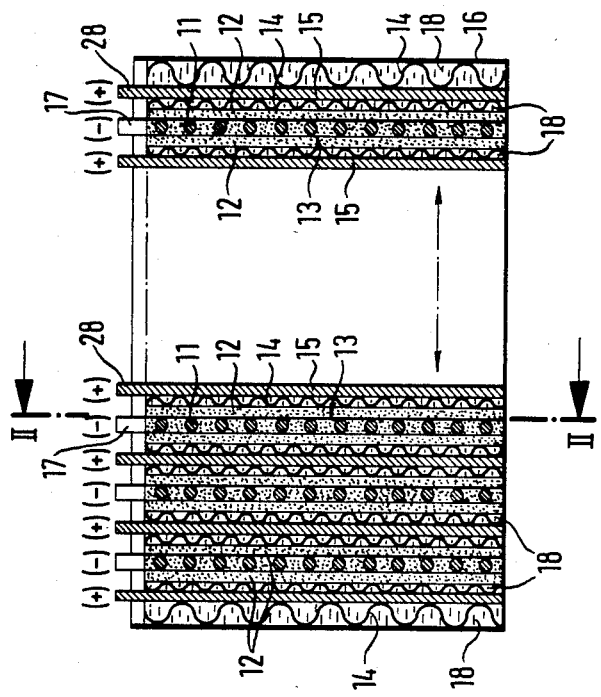
FIG. 1 a schematic cross-section of an arrangement for the discontinuous carrying out of the process of the invention, with the pack of plates being interrupted in order to avoid confusing the drawings, FIG. 2 a view on the line II—II of FIG. 1, and FIG. 3 a schematic illustration of an arrangement for carrying out the process of the invention in counterflow.
Figure 2:
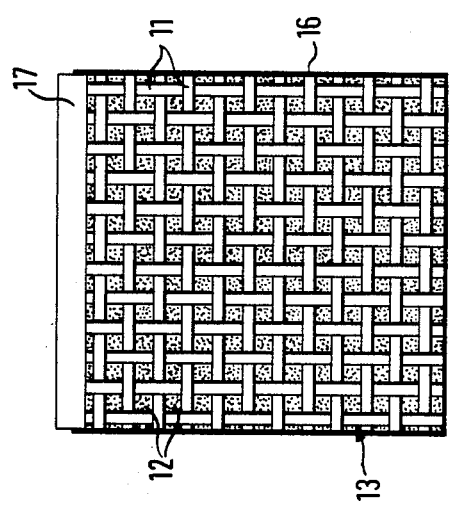

As seen in FIGS. 1 and 2 the arrangement of the invention consists alternately of reduction plates 13, separators 14 and anode plates 15 having a terminal strip 28 at the top for the application of a positive potential, which are closely packed together and accommodated as a pack in a container 16 which they fill. In addition dilute sulphuric acid 18 which fills out the space containing the separators 14 is present in the container 16 as electrolyte.

Each reduction plate 13 consists of a metallic grid 11 with a powdery-granular mixture 12 of lead and lead compounds being pressed around the metallic grid 11 from both sides. A terminal strip 17 to which a negative potential can be applied is located at the top of the metallic grid 11. The pressed mixture 12 of lead and lead compounds is of restricted porosity and thus capable of absorption. It is steeped in the diluted sulphuric acid 18.

The entire pack of the plates 13, 14, 15 can preferably be handled as a unit and can be brought into and removed from the container 16.

The reduction of the reduction plates 13 formed from the accumulator lead scrap takes place in accordance with a special example as follows:

First of all the pack of plates 13, 14, 15 is introduced into the container 16 with a sulphuric acid of 27% concentration and a temperature of 60° C.

A current having a current density of 20 A/kg is passed through the reduction plate 13 by respectively connecting the terminal strips 17 of the cathode reduction plates 13 and the terminal strips 28 of the cathode plates 15 to a power supply (not illustrated). This process step is carried out until 70% of the previously calculated quantity of electricity has been consumed. The pack of plates is then subsequently removed from the container 16 and is arranged in a container having a sulphuric acid concentration of around 10% in order to carry out the second reduction stage. The initial current density amounts in this case to 30 A/kg. The reduction in this second stage is carried out until approximately 110 to 120% of the theoretical quantity of electricity has been consumed whereby a slowly increasing generation of hydrogen is observed. In order to improve the current yield the current density is then reduced in steps at the onset of gasing up to a final value of 3 A/kg. After reaching 1.35 times the theoretical quantity of electricity consumed the reduction plates are flushed out with water. In this manner a complete conversion can be obtained after a consumption of less than 1.4 times the theoretical quantity of electricity which corresponds to an integral current yield of approximately 70%.

The lead sponge which is generated is subsequently preferably melted out in a lead melt under a protective or inert gas.

Figure 3:
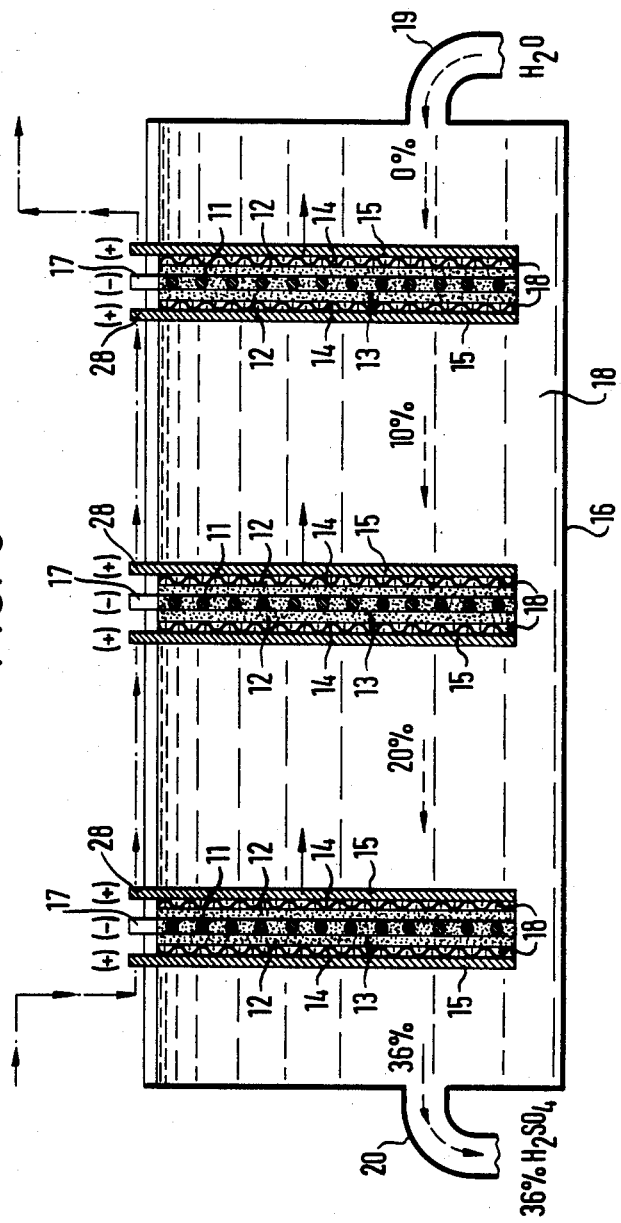

FIG. 3 illustrates in a purely schematic manner how the process of the invention can be continuously carried out in counterflow.

Individual packs of plates 11, 12, 14 are suspended in a container 16, which should be made substantially longer than shown in FIG. 3, from one end of the container, for example at the left end of the contaner 16 in the sense of the chain-dotted line in the sulphuric acid which is concentrated there and which has for example a concentration of 36% and is then continuously displaced in the direction of the extended arrow in the direction towards the other end of the container with the voltage required to achieve the necessary current density being applied to the terminal strips 17, 28. At the right hand end of the container there is a connection stub 19 for the introduction of water whereas an extraction stub 20 for drawing off sulphuric acid of 36% concentration is provided at the left end. Thus, while the packs of plates 11, 12, 13 are continuously moved from left to right the water or the sulphuric acid which is of continuously increasing concentration moves from right to left in accordance with the chain-dotted arrows. As a result of the reduction of the reduction plate of the invention the concentration of the sulphuric acid continuously increases from right to left and increases for example from 0% via 10% and 20% to 36% as is shown schematically in FIG. 3. As the sulphuric acid concentration at the end of the process amounts to 0% the entire process can be carried out in a single working step from the highest concentration up to the flushing step. The requirement is solely that the container 16 is sufficiently long and that a continuous drop in concentration is obtained by suitable measures from one end to the other end of the container 16. In this connection the speed of diffusion or the speed of flow of the acid within the packs of plates must be taken into account in just the same way as the speed of transport of the pack of plates and the speed of flow of the electrolyte 18 in the container 16.

We claim:

1. A method for the recovery of lead from old lead accumulator scraps, comprising the steps of:
   mechanically comminuting the old lead accumulators;
   separating broken plastic from the remaining mixture of lead and lead compounds by sifting;
   separating out coarser metal parts;
   pressing a mixture of lead and lead compounds present as a powdered or granular mixture as a porous layer to a cathode plate arranged in a spaced relationship from an anode plate;
   applying electrical current from the cathode plate to the anode plate, as the first electrolyzing step, in a first electrolyte solution having an initial first concentration of sulfuric acid, wherein the first concentration of sulfuric acid increases during said first electrolyzing step; and
   subsequently applying electrical current from the cathode plate to the anode plate, as the second electrolyzing step, in a second electrolyte solution having an initial second concentration of sulfuric acid which is lower than the concentration of sulfuric acid in the initial first concentration of sulfuric acid used in said first electrolyzing step, wherein the second concentration of sulfuric acid increases during said second electrolyzing step.

2. The method of claim 1, wherein the first electrolyte concentration lies between 25% and 40%.

3. The method of claim 1, wherein the first electrolyte concentration lies between about 27% and about 36%.

4. The method of claim 1, wherein the second electrolyte concentration lies between about 8% and about 25% by weight.

5. The method of claim 1, wherein the second electrolyte concentration lies between about 10% and about 20% by weight.

6. The method of claim 1, wherein the second electrolyte concentration lies between about 14% and about 18% by weight.

7. The method of claim 1, wherein the first electrolyzing step is conducted in a first electrolyte concentration of sulfuric acid of about 20% and permitted to continue up to a sulfuric acid concentration of about 25%.

8. The method of claim 1, wherein the first electrolyzing step is conducted in a first electrolyte concentration of sulfuric acid of about 25% and permitted to continue up to a sulfuric acid concentration of about 30%.

9. The method of claim 1, wherein the first electrolyzing step is conducted in a first electrolyte concentration of sulfuric acid of about 27% and permitted to continue up to a sulfuric acid concentration of about 35%.

10. The method of claim 7, wherein the second electrolyzing step is conducted in a second electrolyte concentration of sulfuric acid of about 8% and permitted to continue up to a sulfuric acid concentration of about 20%.

11. The method of claim 8, wherein the second electrolyzing step is conducted in a second electrolyte concentration of sulfuric acid of about 10% and permitted to continue up to a sulfuric acid concentration of about 25%.

12. The method of claim 9, wherein the second electrolyzing step is conducted in a second electrolyte concentration of sulfuric acid of about 15% and permitted to continue up to a sulfuric acid concentration of about 27%.

13. The method of claim 1, wherein the second electrolyzing step is permitted to continue up to a concentration of sulfuric acid which is about the same as the sulfuric acid concentration of the first electrolyte used in the first electrolyzing step.

14. The method of claim 1, wherein the first electrolyzing step is continued until any tetravalent lead compounds in the first electrolyte solution are substantially completely reduced to lead metal.

15. The method of claim 1, wherein the second electrolyzing step is permitted to continue until reduction of any divalent lead compounds in the second electrolyte solution is substantially complete.

16. The method of claim 1, wherein the first electrolyte solution remaining after the first electrolyzing step is removed from the reaction vessel and replaced by water.

17. The method of claim 16, wherein the water used to replace the first electrolyte solution subsequent to the first electrolyzing step is taken from flushing water which is used to flush the anode plate and cathode plate at the end of the second electrolyzing step.

18. The method for recovering lead from old lead acid accumulator scraps, comprising the steps of:
    mechanically comminuting the lead accumulators;
    collecting the old acid;
    separating the mixture of lead and lead compounds from broken plastic material;
    separating coarser metal parts from the powdered or granular lead and lead compounds;
    pressing the mixture of the powdered or granular lead and lead compounds as a porous layer against a cathode plate;
    arranging the cathode plate at a relatively small distance from an anode plate;
    applying electrical current from the cathode plate to the anode plate, as the first electrolyzing step, in a first electrolyte solution having an initial first concentration of sulfuric acid, wherein the first concentration of sulfuric acid increases during said first electrolyzing step;
    subsequently applying electrical current from the cathode plate to the anode plate, as the second electrolyzing step, in a second electrolyte solution having an initial second concentration of sulfuric acid which is lower than the concentration of sulfuric acid in the initial first concentration of sulfuric acid used in said first electrolyzing step, wherein the second concentration of sulfuric acid increases during said second electrolyzing step; and
    pressing the mixture of lead and lead compounds together with the cathode plate in a sandwiched relationship to a thin self-supporting reduction plate.

19. The method of claim 18, including the step of providing the cathode plate with apertures.

20. The method of claim 18, including the step of constructing the cathode plate as a cathode grid.

21. The method of claim 18, including the stelp of constructing the cathode grid from expanded metal.

22. The method of claim 18, including the step of sandwiching the pressed mixture of lead and lead compounds along both sides of the cathode plate.

23. The method of claim 18, including the step of pressing the mixture of lead and lead compounds to extend away from at least one side of the cathode plate to a thickness of no more than about 2 cm.

24. The method of claim 18, including the step of pressing the mixture of lead and lead compounds to extend away from at least one side of the cathode plate to a thickness of no more than about 1.5 cm.

25. The method of claim 18, including the step of pressing the mixture of lead and lead compounds to extend away from at least one side of the cathode plate to a thickness of no more than about 1 cm.

26. The method in accordance with claim 22, including the step of pressing the mixture of lead and lead compounds along at least one one side of the cathode plate to a thickness of about 2 mm to 8 mm.

27. The method of claim 22, including the step of pressing the mixture of lead and lead compounds along one side of the cathode plate to a thickness of about 3 mm to about 5 mm.

28. The method of claim 19, including the step of providing apertures in the cathode plate which are from about 1 cm to about 2 cm in their largest dimension.

29. The method of claim 20, including the step of providing grid openings in the cathode plate which are from about 2 mm to about 10 mm in their greatest dimension.

30. The method of claim 20, including the step of providing grid openings in the cathode plate which are from about 4 mm to about 8 mm in their greatest dimension.

31. The method of claim 18, further comprising the step of homogenizing the mixture of lead and lead compounds with water prior to the pressing step.

32. The method of claim 31, wherein the water content ranges from about 2% to about 20% by weight.

33. The method of claim 31, wherein the water content ranges from about 6% to about 10% by weight.

34. The method of claim 31, wherein the press pressure for the pressing step ranges froma about 100 kp/cm$^2$ to about 600 kp/cm$^2$.

35. The method of claim 31, including the step of providing a press pressure for the pressing step ranging from about 200 kp/cm$^2$ to about 500 kp/cm$^2$.

36. The method of claim 1, further comprising the step of combining the mixture of lead and lead compounds with a supply of finely divided lead prior to the pressing step.

37. The method of claim 1, further comprising the step of melting the reduced lead in a lead fusion bath subsequent to the second electrolyzing step.

38. The method of claim 37, including the step of adding the resulting slag which forms in or on the lead fusion bath to the mixture of lead and lead compounds which is to be reduced in the first electrolyzing step.

39. The method of claim 1, wherein the porosity of the mixture of lead and lead compounds is from about 50% to about 70%.

40. The method of claim 1, wherein the porosity of the mixture of lead and lead compounds is about 60%.

41. The method of claim 1, further comprising the step of providing a current density during the first electrolyzing step of about 10 A/kg to about 30 A/kg.

42. The method of claim 1, further comprising the step of providing a current density during the first electrolyzing step of about 15 A/kg to about 25 A/kg.

43. The method of claim 1, further comprising the step of providing a current density during the first electrolyzing step of about 30 A/kg.

44. The method of claim 1, further comprising the step of providing a current density during the second electrolyzing step of about 20 A/kg to about 40 A/kg.

45. The method of claim 1, further comprising the step of providing a current density during the second electrolyzing step of about 25 A/kg to about 35 A/kg.

46. The method of claim 1, further comprising the step of providing a current density during the second electrolyzing step of about 30 A/kg.

47. The method of claim 1, further comprising the step of maintaining the temperature of the mixture of lead and lead compounds and of the electrolysis bath during the first and second electrolyzing steps from about 25° C. to about 95° C.

48. The method of claim 47, further comprising the step of maintaining the temperature of the mixture of lead and lead compounds and of the electrolyzing bath during the first and second electrolyzing steps from about 40° C. to about 80° C.

49. The method of claim 47, further comprising the step of maintaining the temperature of the mixture of lead and lead compounds and of the electrolysis bath during the first and second electrolyzing steps at about 60° C.

50. The method of claim 1, further comprising the step of reducing the current density during the first electrolyzing step at the appearance of gases and continually reducing the current density until it attains about 1/10 of the initial current density.

* * * * *